United States Patent [19]

Fencl et al.

[11] 3,991,620
[45] Nov. 16, 1976

[54] APPARATUS FOR DETERMINING IMBALANCE OF TIRES AND THE LIKE

[75] Inventors: Vernon R. Fencl, Northbrook; Demetrios J. Rigas, Skokie, both of Ill.

[73] Assignee: Grotnes Machine Works, Inc., Chicago, Ill.

[22] Filed: May 8, 1975

[21] Appl. No.: 575,750

[52] U.S. Cl. .................................... 73/462; 73/480
[51] Int. Cl.² ........................................ G01M 1/16
[58] Field of Search ........ 73/66, 462, 480, 482–485, 73/487, 136 R

[56] References Cited
UNITED STATES PATENTS

| | | | |
|---|---|---|---|
| 2,623,385 | 12/1952 | Jamieson | 73/136 R |
| 3,352,732 | 11/1967 | Darr | 73/485 X |
| 3,505,863 | 4/1970 | Lucia | 73/136 R X |
| 3,557,626 | 1/1971 | Heide | 73/462 |
| 3,741,017 | 6/1973 | Reiser | 73/480 |

Primary Examiner—James J. Gill
Attorney, Agent, or Firm—Leydig, Voit, Osann, Mayer & Holt, Ltd.

[57] ABSTRACT

Method and apparatus for single plane, balance determination of cylindrical parts and the like, particularly adapted for use with determining imbalance of unmounted tires. The tire to be tested for balance is supported for rotation about a horizontal axis and driven in a substantially constant slow speed while torque monitoring means generates an output proportional to the variations in torque resulting from driving of the support means, electrical signal conversion means determines the magnitude of imbalance as being one half the difference between the maximum and minimum torque output values which is shown on a visual output display. A marking device is triggered to indicate the position on the tire at the instant the maximum torque output occurs to locate the position of the center of gravity on a horizontal line moving upward around the rotation axis.

4 Claims, 5 Drawing Figures

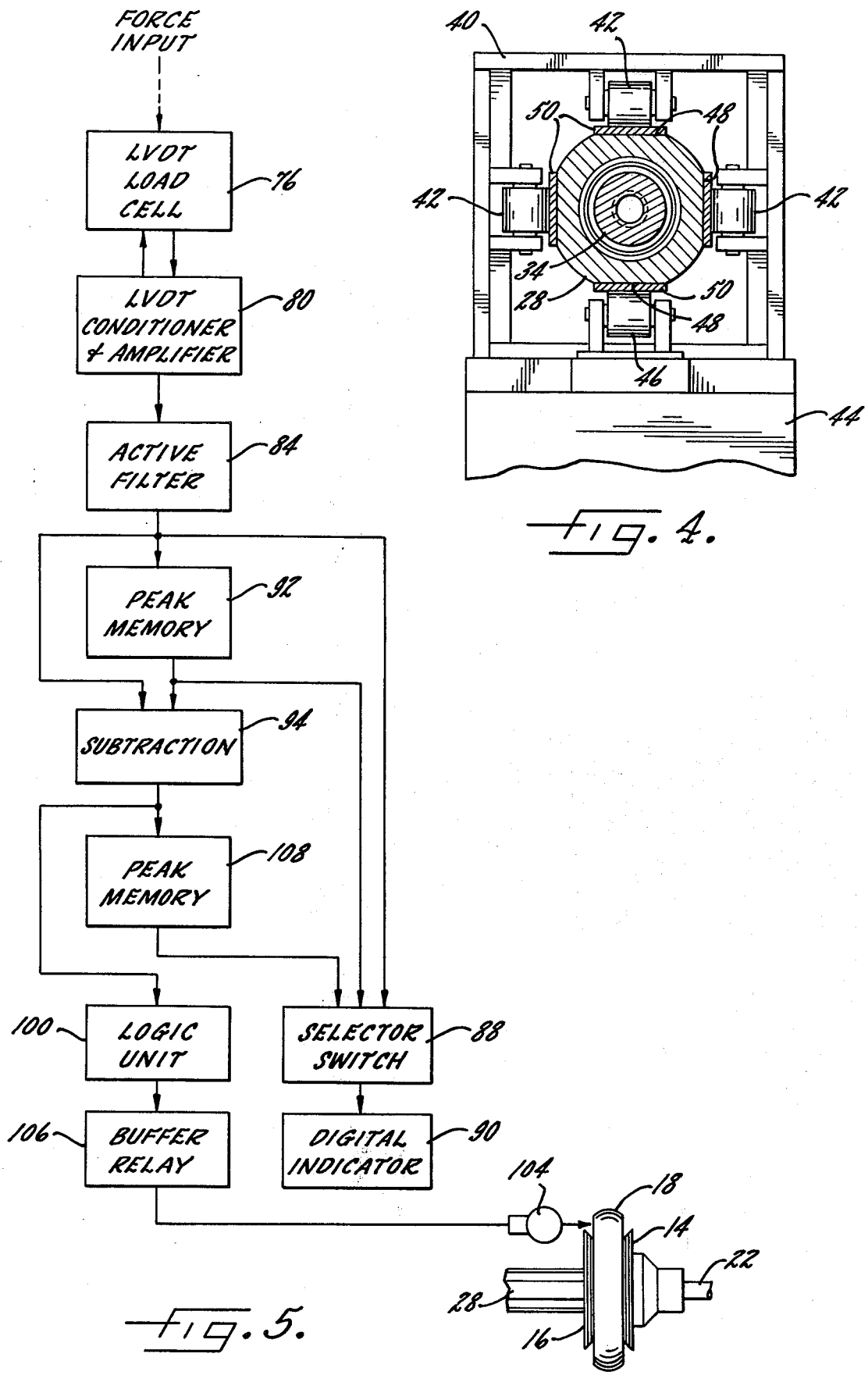

APPARATUS FOR DETERMINING IMBALANCE OF TIRES AND THE LIKE

DESCRIPTION OF THE INVENTION

The present invention relates generally to methods and apparatus for determining imbalance of cylindrical parts and, more particularly, to methods and apparatus for rapidly and efficiently determining the imbalance of cylindrical parts in conjunction with mass production facilities. In its principal aspects the present invention is concerned with improved single plane imbalance determining methods and apparatus which differ from conventional static and dynamic balancing techniques, yet which do not require the complexities of ordinary dynamic balancing systems. While not so limited in its application, the invention will find especially advantageous use in determining imbalance of relatively large annular products, such, merely by way of example, as unmounted vehicle tires.

In the past, the tire industry, particularly, has not made wide use of balancing techniques in conjunction with the mass production of tires and balancing was done statically and/or dynamically when the wheel is mounted to the tire after it has been sold by the tire manufacture.

Cylindrical products, particularly large annular ones do not readily lend themselves to quick and rapid dynamic balancing. The problem arises in part because of the absence of a center upon which to locate the part for balancing.

In many cases it is acceptable to balance a large annular product in conjunction with a second part upon which the annular item mounts thereby providing a center from which to locate. In the case of the tire, quality control checks at a tire manufacturing facility which would require balance information relating to the tire itself do not readily permit use of conventional dynamic balancing equipment. Not only is the mounting operation time consuming, but it also may introduce additional variables into the balance determination. One recent example of an approach toward dynamically balancing a rotating vehicle tire may be noted in U.S. Pat. No. 3,862,570 issued Jan. 28, 1975.

Accordingly, it is a primary object of the present invention to provide methods and apparatus for determining the imbalance of cylindrical products in a single plane which avoids the disadvantages of conventional static and dynamic balancing techniques, yet which enables rapid and efficient determinations of imbalance in a new and improved manner.

It is another object of the invention to provide methods and apparatus for determining imbalance of cylindrical parts in a single plane while rotating the part about a horizontal axis and without the need for directly mounting the parts on center defining items used in conjunction therewith.

It is a further object of the invention to provide a method and apparatus which permits fast and efficient out of balance determinations to be made with a minimum of set up time, operator skills and equipment needed for making the determinations.

In this connection it is an object of the invention to provide a method and apparatus for determining the imbalance of unmounted tires without the need to first mount them on wheels.

A more specific object of the present invention is to provide an apparatus which is capable of being used for determination of imbalance of several different sizes of tires.

Other objects and advantages of the invention will become apparent as the following description proceeds, taken in conjunction with the accompanying drawings, in which:

FIG. 4 is a partial sectional view taken along the line 4—4 in FIG. 1; and

FIG. 5 is a schematic of the electrical arrangement of the fork monitoring and indicating system.

Figure 1:
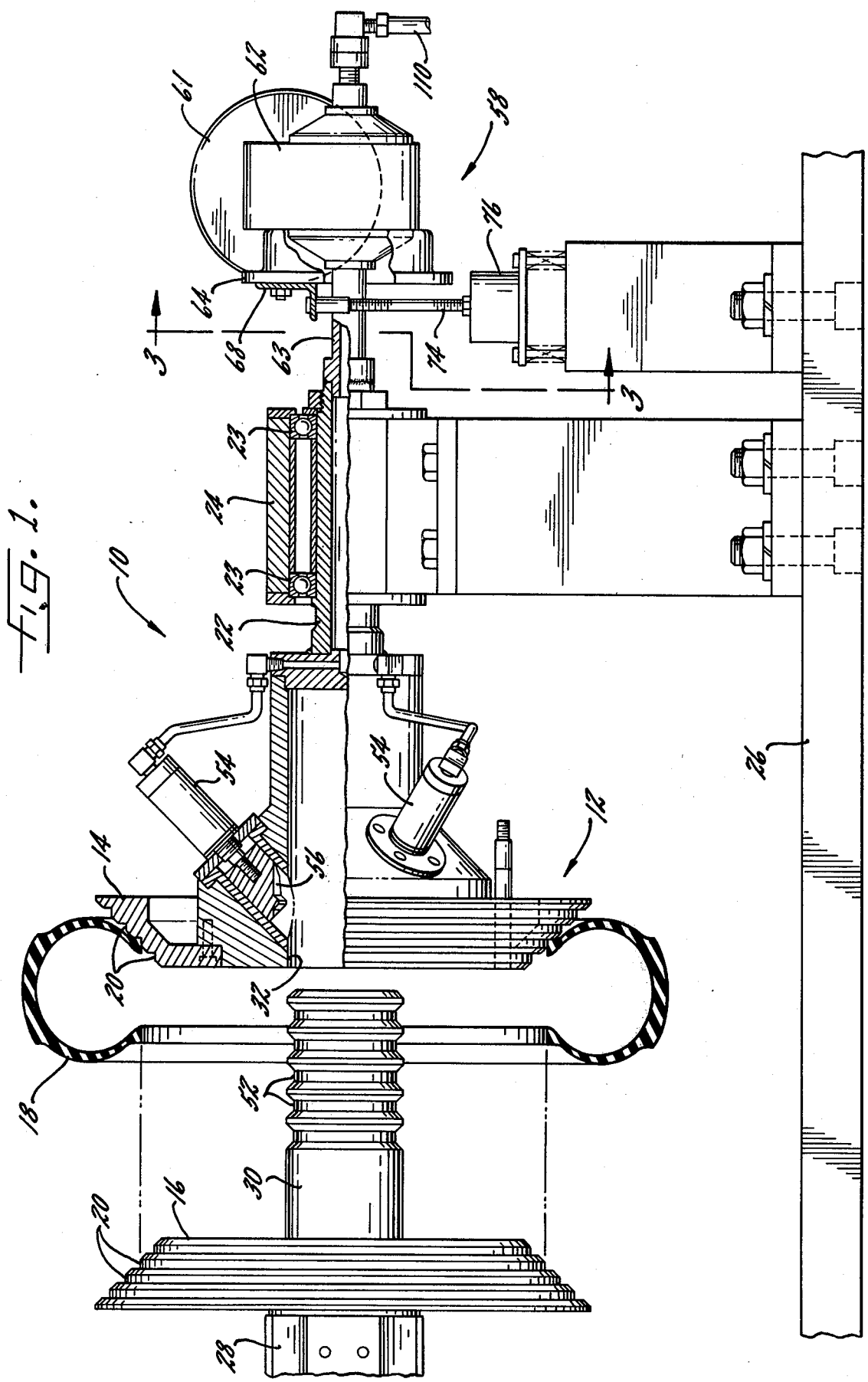
FIG. 1 is a fragmentary side elevation view, partly in section, of a balance determining apparatus embodying the features of the present invention, here depicting the apparatus in readiness to receive a tire to be balanced.

While the invention is susceptible of various modifications and alternative forms, a specific embodiment has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention.

Figure 2:
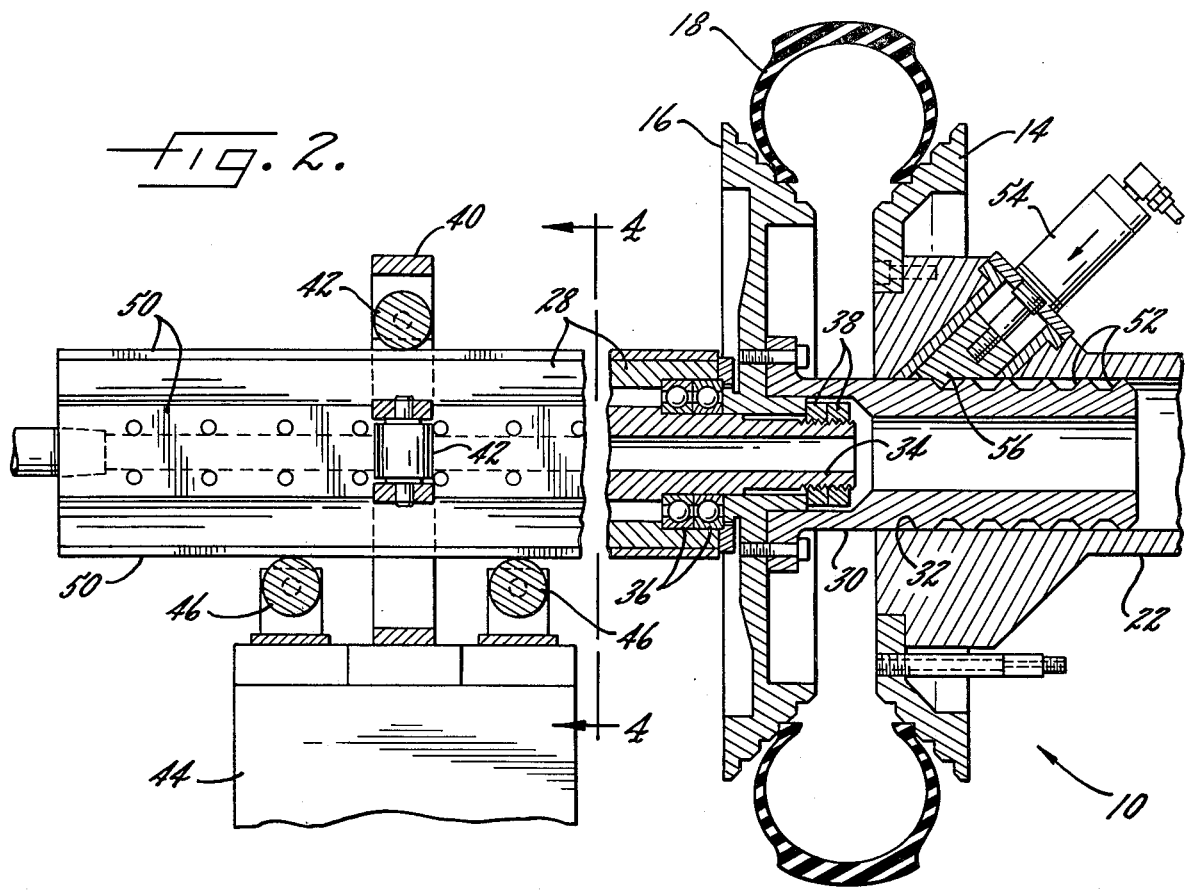
FIG. 2 is a fragmentary side elevation of the tire supporting structure of the apparatus shown in FIG. 1 with the supporting structure from the left side being included and here showing the tire as it is held in position for operation with the apparatus.

Turning now to the drawings, and referring to FIGS. 1 and 2, conjointly, there is shown an exemplary apparatus for performing the present balancing method and particularly arranged for use in determining single-plane, out of balance of a tire or the like. In general, the method carried out by the apparatus 10 includes the positioning and supporting of the tire with its axis of rotation being horizontal, rotating the tire about the axis at a substantially constant speed while supported by a bearing system of essentially constant friction characteristics, measuring the torque required to rotate the part to determine the maximum and minimum torque and determining the magnitude of the imbalance as represented by a function of the difference between the maximum and minimum torque values measured. The location of the position of the center of gravity on a radial line along the part is indicated at the instant the maximum torque is determined to occur.

To this end, the apparatus 10 includes a hub arrangement, indicated generally at 12, which comprises a pair of spaced apart hubs 14, 16 adapted to receive a product such as tire 18 therebetween. Each of the hubs is provided with a plurality of concentric steps 20 and the hubs are generally frustoconical in shape to permit use with different size tires 18 without requiring any changeover to accommodate such different products to be tested.

For the purpose of mounting the tire 18 between the hubs 14, 16, the hub 14 is carried by a spindle 22 which is longitudinally fixed, but rotatably carried with a bearing 23 in a bearing housing 24 which is, in turn, affixed to a support base 26. Hub 16 is rotatably carried by longitudinally movable, spindle 28 which includes an extension sleeve 30 adapted to be telescopically received within central opening 32 of spindle 22.

As best shown in FIG. 2, the spindle 28 has a reduced diameter internal quill portion 34 which rotatably carries the hub 16 between bearings 36 and adjustable retaining nuts 38. The extension sleeve 30 is attached to the hub 16 for rotation therewith.

In order to support the spindle 28 for longitudinal movement toward and away from the hub 14 carried by spindle 22 (FIGS. 2 and 4), spindle 28 is carried by a support frame 40 which is substantially square and includes a plurality of guide rollers 42 projecting from the internal top and side surfaces of the support 40. The support 40 is carried by a base 44 which in turn also carries a pair of spaced apart guide rollers 46 to provide firm support along the longitudinal direction.

As best shown in FIG. 4, the spindle 28 is provided with flattened sides 48 adjacent the guide rollers 42, 46 and interposed therebetween are bearing strips 50 to provide smooth surfaces for the spindle sleeve 28 to translate along.

A power actuator (not shown) may be used to advance and retract the spindle 28 to compress the tire 18 between the hubs 14, 16.

In order to provide for positive coupling between the hubs 14, 16, the telescoping extension sleeve 30 is provided with a plurality of notches 52 adjacent its outer end, and the spindle 22 carries a plurality of power actuated latching devices 54 which advance and withdraw latching members 56 to engage and disengage with the notches 52 of sleeve 30. It will be appreciated, however, that when the spindle 28 is moved by a power actuator, rather than manually for example, the power latching arrangement is not necessarily needed to hold the hubs 14, 16 in their properly spaced position to support the tire 18, but it may still be desirable to use the latches as an additional assurance that the hubs and supported tire will be rotated in unison.

Figure 3:
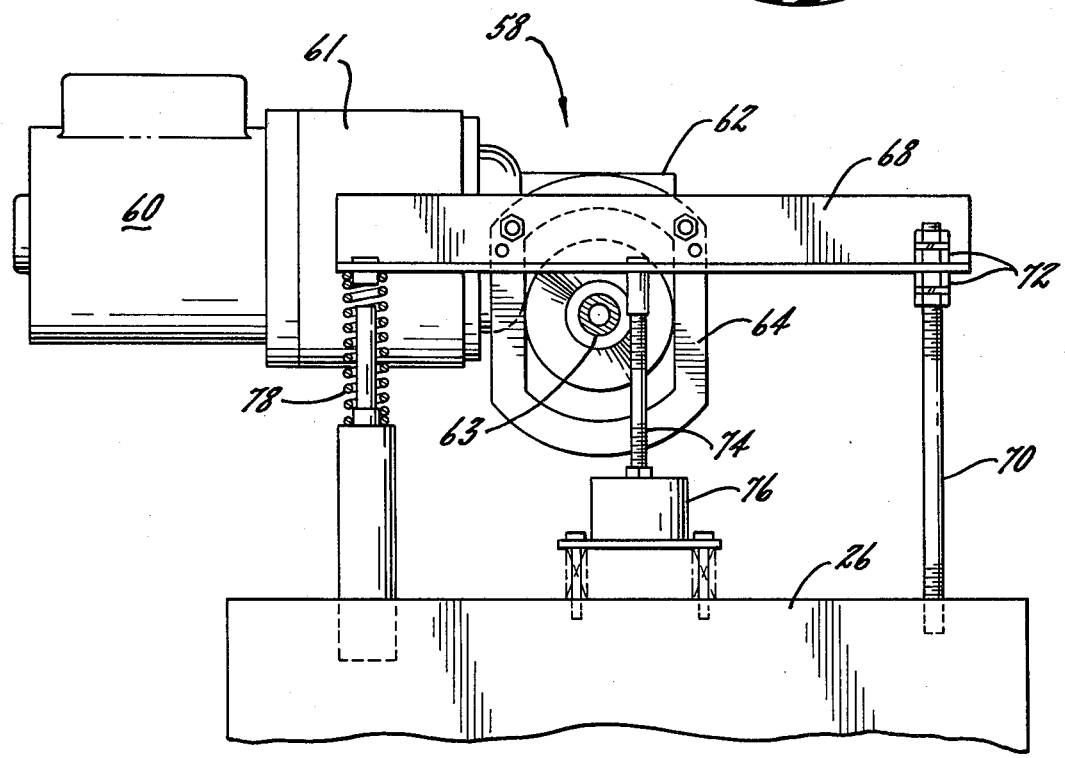
FIG. 3 is a sectional view taken along the line 3—3 in FIG. 1.

In order to rotate the spindle 22, there is provided a drive and torque monitoring system 58 (FIGS. 1 and 3) connected to the spindle 22. The drive portion includes a motor 60 and a speed reducing and regulating device such as an electric clutch 61 coupled to a speed reducer 62. The output shaft 63 of speed reducer 62 rotates spindle 22 at a substantially constant, slow speed, such for example as 30 revolutions per minute.

In accordance with the invention, the speed reducer 62 together with the clutch 61 and motor 60 is secured to a lever arm 68 bolted to the reducer housing 64 and one end of the lever arm 68 is secured to the base 26 with an upstanding rod 70, the lower end of which is threadably received by the base 26 and the upper end being secured to the lever arm with nuts 72. Intermediate the ends of the lever arm 68 there is provided an adjustable connecting rod 74 attached to a load-sensitive surface of a LDVT load cell 76. At the opposite end of the lever arm 68 there is provided a resilient support 78 to counteract the weight of the drive system 58 and permit use of a load cell 76 having a range and sensitivity sufficient to pick up the variations in force exerted on the cell as a reaction to the rotational torque transmitted to the spidle 22. Accordingly, the force exerted on load cell 76 by rod 74 will vary with the instantaneous driving torque being applied.

Referring now to FIG. 5, there is shown an exemplary electrical block diagram for converting the output signals from the load cell to usable determinations of imbalance present in the tire being tested. In the illustrative arrangement, the load cell 76 output is coupled through a LVDT conditioner and amplifier 80 and active filter 84 so that extraneous signals and unwanted components of the signal are removed. The output of the filter 84 is received through a selector switch 88 by a digital indicator 90 which may for example provide readings in ounce inches of torque to be observed by the operator. The filter output is also connected to a first peak memory unit 92 to store the maximum torque signal output received from the load cell.

A subtraction unit 94 is provided to algebraically subtract signals received from the peak memory 92 so that the maximum deviation which is the minimum torque generated output signal is stored in a second peak memory 108.

A logic unit 100 transmits pulse outputs representative of the instant during each revolution of the tire at which the driving torque is a maximum. The maximum torque is experienced when the center of gravity is in the same horizontal plane as the axis of rotation and moving upward, so that by positioning a marking unit 104, such for example as a spray device, and triggering it with a buffer relay 106 actuated by the pulse logic output of unit 100, the orientation of the fire imbalance can be identified.

The selector switch 88 receiving the signal information from the peak memory units as to the maximum and minimum torque generated signals triggers an output which is a function of one-half the difference between the maximum and minimum torque value signals measured. The signal displayed on the digital output indicates the magnitude of the imbalance moment of the part.

With the information as to the angular position and magnitude of imbalance, appropriate amounts of material may be added or taken away at a selected radial distance along the determined and marked position to achieve balance in the tire.

In order to more fully understand the operation of the present invention, a brief description will be provided commencing with reference to FIG. 1. After appropriate steps have been taken to calibrate the instrumentation, the tire is held in position against the hub 14 and hub 16 is moved into position against the tire with the sleeve 30 telescoped within the opening 32 of spindle 22, substantially as shown in FIG. 2. Compressed air is forced into the tire through the hollow interior of spindle 22 from fitting 110 located at the extreme right in FIG. 1. The source of the compressed air is not shown but may be conventionally available in a manufacturing plant. Once the tire is inflated to the predetermined amount of pressure, the motor 60 is energized and the tire is brought to the constant desired rotational speed at which point a reading may be taken from the digital indicator 90 while the marking device 104 automatically notes the location on the tire of any imbalance. The entire operation of loading, making the determinations and unloading is fairly rapid and quite easy so that balancing can be achieved in conjunction with mass production facilities in a most expeditious manner.

We claim as our invention:

1. Apparatus for single plane, balance determination of an annular part as, for example, a tire, comprising in combination:
    a base;
    support means for said annular part, said support means comprising a first and a second generally frusto-conical hub, said first and second hubs being journalled in said base for rotation about a common horizontal axis, said second hub being axially movable;

means to selectively axially position said second hub such that said annular part may be inserted, centered and clamped between said first and second hubs;

means for rotatably driving said support means and said annular part at a constant rotational speed about the axis of said support means, said driving means comprising a housing and a drive shaft, said drive shaft being coupled to said support means; and torque absorbing and monitoring means interposed between said driving means housing and said base, said torque absorbing and monitoring means serving to counteract the reaction torque exerted by said driving means housing relative to said base as a result of the driving of said support means and said annular part by said driving means, said torque absorbing and monitoring means providing an indication of the magnitude of said reaction torque as said support means and annular part are driven.

2. Apparatus as set forth in claim 1 wherein each of said generally frusto-conical hubs comprises a plurality of concentric steps, each of said concentric steps corresponding to the inside diameter of a standard size tire such that by varying the spacing between the hubs, the relative orientation of the corresponding concentric steps of said hubs can be made to duplicate the mounting conditions for a plurality of standard size tires.

3. Apparatus as set forth in claim 1, one of said hubs further comprising an axial extension projecting outwardly toward the other of said hubs, said other hub further comprising an axial opening for telescopically receiving said extension, said apparatus further comprising means for latching said axial extension in said axial opening to connect said hubs for rotation in unison.

4. Apparatus as set forth in claim 1, said apparatus comprising means for inflating a tire disposed between said hubs.

* * * * *